(12) United States Patent
Lin et al.

(10) Patent No.: US 7,376,886 B2
(45) Date of Patent: May 20, 2008

(54) METHOD AND RELATED APPARATUS FOR DATA ERROR CHECKING

(75) Inventors: Jiing Lin, Taipei Hsien (TW); Iris Jiang, Taipei Hsien (TW); Jie Ding, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 498 days.

(21) Appl. No.: 10/907,888

(22) Filed: Apr. 19, 2005

(65) Prior Publication Data

US 2006/0090117 A1    Apr. 27, 2006

(30) Foreign Application Priority Data

Oct. 13, 2004  (TW) .............................. 93131043 A

(51) Int. Cl.
*G11C 29/00* (2006.01)

(52) U.S. Cl. ..................................... 714/764

(58) Field of Classification Search ............... 714/703, 714/763, 764
See application file for complete search history.

(56) References Cited

U.S. PATENT DOCUMENTS

| 5,481,552 | A  |    | 1/1996  | Aldereguia et al. |
| 6,216,247 | B1 |    | 4/2001  | Creta et al. |
| 6,460,157 | B1 | *  | 10/2002 | Chen et al. ............... 714/758 |
| 7,065,695 | B2 | *  | 6/2006  | Cameron et al. ......... 714/755 |

* cited by examiner

*Primary Examiner*—Shelly A Chase
(74) *Attorney, Agent, or Firm*—Winston Hsu

(57) ABSTRACT

A method for data error checking includes accessing a plurality of sets of data, each of the sets of data having a plurality of bits; integrating the plurality of sets of data into integral data; generating error checking data according to the integral data, the error checking data being changed following any change of the plurality of sets of data; dividing the error checking data into a plurality of sets of sub-checking data, each set of sub-checking data corresponding to one of the plurality of sets of data; and when transmitting each of the plurality of sets of data in order, transmitting the corresponding sub-checking data in the meantime.

19 Claims, 6 Drawing Sheets

METHOD AND RELATED APPARATUS FOR DATA ERROR CHECKING

BACKGROUND OF INVENTION

1. Field of the Invention

The present invention relates to a method and related apparatus for data error checking, and more particularly, to a method and related apparatus for performing data error checking/correction while accessing a higher data-rate memory.

2. Description of the Prior Art

In the current information society, computer systems are widely used in many aspects of life. Besides some general applications of personal computers or servers, such as an automatic teller machine, some vending machines and information appliances also have embedded computer systems. For different applications, different computers may have different system requirements. For example, a personal computer/server usually requires higher efficiency and scalability, but a financial service terminal, such as an automatic teller machine, has more need of data correctness. Therefore, how to meet requirements of every kind of computer system is a key research topic of information technology companies.

As known by those skilled in the art, a computer system usually comprises a central processing unit, memory, chipset, and other peripheral devices, such as a hard drive, CD-ROM, input/output interface, and network-accessing device. The central processing unit controls the operation of the computer system to execute programs and process data. The memory, such as a random access memory, stores programs and data needed by the central processing unit during operation. The chipset, which is coupled between the central processing unit and the memory, manages data access between the central processing unit (or other devices) and the memory. In addition, the chipset also can perform data error checking/correction to ensure data correctness.

In a mainstream memory architecture, such as the memory architecture of a personal computer, the chipset can access data in the memory via a 64-line bus, that is, the chipset can access 64-bit data via the bus. In order to ensure correctness of 64-bit data, a "64-bit data/8-bit error checking code" algorithm has been developed to generate an 8-bit error checking code according to a 64-bit data for performing data error checking/correction. In other words, under such mechanism, apart from the 64-line bus for accessing data, there must be an extra 8-line bus for transmitting 8-bit error check codes.

In the prior art, the operation of data error checking/correction performed by the chipset can be described as follows. When the chipset intends to store 64 bits of data into the memory, the chip first uses the "64-bit data/8-bit error checking code" algorithm to generate an 8-bit error checking code according to the 64-bit data, and then stores the 64-bit data with the 8-bit error checking code into the memory. When the chipset accesses the 64-bit data from the memory, the 8-bit error checking code will be accessed by the chipset in the meantime for reference. After accessing the 64-bit data, the chipset uses the "64-bit data/8-bit error checking code" algorithm again to generate another new 8-bit error checking code according to the accessed 64-bit data, and then compares the new 8-bit error checking code with the original 8-bit error checking code to check whether these two 8-bit error checking codes match each other. If so, this means the accessed 64-bit data is correct; if not, then the accessed 64-bit data must be damaged and have some error.

Under such situation, according to the error checking code, the chipset can perform a corresponding error management process to judge the type and location of the error, or even to repair the accessed 64-bit data or report the error to the central processing unit in order to inform the computer system user.

In the applications of the personal computer/server, the memory is composed of memory modules, and the current mainstream memory module comprises nine memory units (memory chips). Each memory unit can provide an 8 bits of data, therefore a memory module totally can provide 72 bits for data transmission at one time. That is, the memory module is able to support the "64-bit data/8-bit error checking code" algorithm, when accessing 64 bits of data from eight memory units using the 8-bit error checking code for performing data error checking/correction.

Although the above error checking/correction mechanism has already become a standard in the information industry, it still lacks flexibility. It is difficult to apply in some low-cost computer systems, which have simpler embedded architecture. For implementing the "64-bit data/8-bit error checking code" algorithm, the prior art accesses 64 bits of data from the memory to generate a corresponding 8-bit error checking code. However, in financial service terminals, it will cost too much to use nine memory units to build a memory. However, when using fewer memory units to build a memory, the prior art cannot access 64 bits of data at a time and so the "64-bit data/8-bit error checking code" algorithm cannot be implemented for performing data error checking/correction. For example, a low-cost computer system usually uses four memory units to build a memory in order to provide 32-bit data, but under such situation, the prior art can only accesses 32 bits of data at a time, which is not conducive to implementation of the "64-bit data/8-bit error checking code" algorithm. Moreover, this increases the complexity and cost if designing a new algorithm for a 32-bit data structure. Moreover, as known by those skilled in the art, 32-bit data requires a 6-bit error checking code to perform data error checking/correction; thus compared with the "64-bit data/8-bit error checking code" algorithm, the "64-bit data/8-bit error checking code" algorithm is more economic. Because in the "32-bit data/6-bit error checking code" algorithm, each bit of data needs 0.1875 bits of error checking code; yet in the "64-bit data/8-bit error checking code" algorithm, each bit of data only needs 0.1275 bits of error checking code.

SUMMARY OF INVENTION

Therefore, this invention provides a method and related apparatus for performing data error checking/correction in many applications, in order to solve the problems of the prior art.

As memory technology keeps improving, data transmission efficiency of a memory is getting better and better. Therefore higher data-rate memory techniques, such as a double-data-rate (DDR) memory, have been developed. Because the double-data-rate memory can transmit a set of data while a clock is rising and falling, the chipset can access two sets of data within a period of the clock. In the preferred embodiment of the present invention, the present invention utilizes this characteristic to make the chipset access a plurality of sets of data within a period of a clock. Then, the chipset integrates the plurality of sets of data into an integral data and generates error checking data according to the integral data in order to perform data error checking/correction.

For example, for a 32-bit data structure of a low-cost computer system, the present invention integrates two sets of 32-bit data, which are accessed within the same period of a clock, into an integral 64 bits of data, and uses the "64-bit data/8-bit error checking code" algorithm to generate an 8-bit error checking code according to the integral 64-bit data. The present invention uses the 8-bit error checking code to perform data error checking/correction to the integral 64-bit data, which is equivalent to performing data error checking/correction to two sets of 32-bit data. Besides the four 8-bit memory units for providing the 32-bit data space, only one 4-bit memory unit is needed for supporting the 4-bit data error checking code. When intending to store two sets of 32-bit data in the memory with double-data-rate, the present invention first integrates these two sets of 32-bit data into an integral set of 64-bit data, and uses the "64-bit data/8-bit error checking code" algorithm to generate an 8-bit error checking code according to the integral 64-bit data, and then divides the 8-bit error checking code into two 4-bit sub-checking data. When separately storing the two sets of 32-bit data into four 8-bit memory units in the same period of the clock, the two 4-bit sub-checking data are stored into the 4-bit memory unit in the meantime.

When accessing data from the memory, the present invention not only separately accesses two sets of 32-bit data in the same period, but also accesses two corresponding sets of 4-bit sub-checking data for reference. The two sets of 32-bit data are integrated into an integral 64-bit data, and the present invention uses the "64-bit data/8-bit error checking code" algorithm to generate an 8-bit error checking code according to the integral 64-bit data. The two sets of accessed 4-bit sub-checking data are also combined to form an 8-bit reference checking code. Comparing the 8-bit error checking code with the 8-bit reference checking code, the present invention can perform data error checking/correction to the integral 64-bit data, which is equivalent to performing data error checking/correction to the original two sets of 32-bit data. With the method mentioned above, the present invention can still use the "64-bit data/8-bit error checking code" algorithm under the 32-bit data structure. The method not only provides a more economical way to reduce the number of bits of error checking code needed by each bit of data, but also eliminates the need of developing a new data error checking/correction mechanism for the 32-bit data structure. Thus the cost and time of manufacturing a computer system can be reduced.

In other words, the present invention can fully utilize the characteristic of the higher data-rate memory technique to integrate a plurality of sets of data, which are accessed within a period of a clock, in order to perform data error checking/correction. The present invention further provides a more economic data error checking/correction mechanism, and also meets different requirements of computer systems under different data structures.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
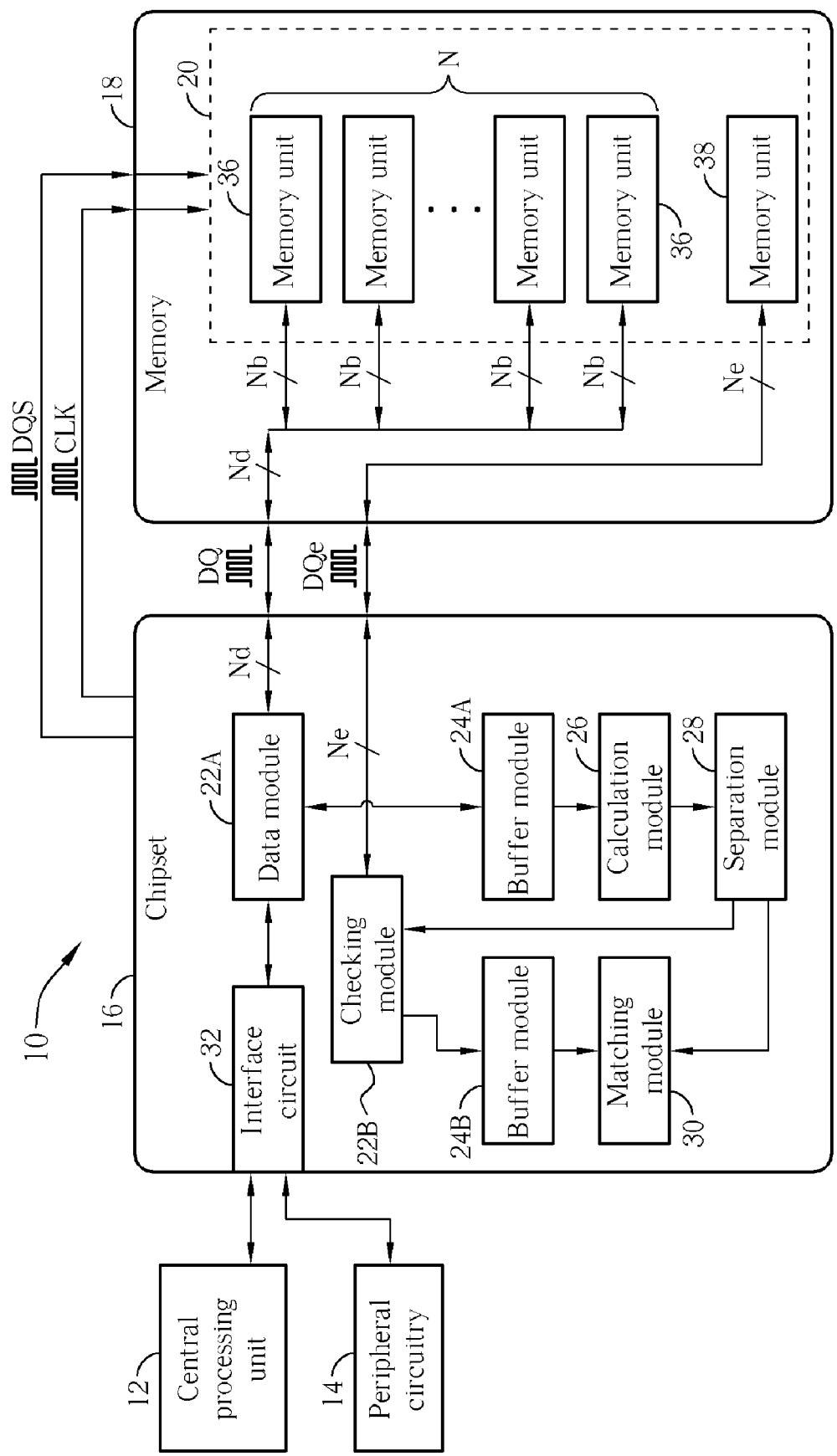
FIG. 1 is a functional block diagram of a computer system according to the present invention.

Please refer to FIG. 1, which shows a functional block diagram of a computer system 10 according to the present invention. The computer system 10 comprises a central processing unit 12, a chipset 16, a memory 18, and peripheral circuitry 14. The central processing unit 12 controls the operation of the computer system 10 to execute programs and process data; the memory 18 stores programs and data needed by the central processing unit 12 during operation; the peripheral circuitry 14 could be a hard drive, CD-ROM or any kind of add-on card (for example, a video card, network card, or sound card etc.); the chipset 16 manages data access between the central processing unit 12, the peripheral circuitry 14, and the memory 18. In addition, the chipset 16 can also perform data error checking/correction to ensure data correctness (i.e. data validity) while accessing data from/to the memory 18.

As mentioned above, the memory of the computer system comprises memory modules, which are formed with memory units. As shown in FIG. 1, the memory 18 comprises a memory module 20, which is formed with a plurality of memory units 36 (suppose the number of the memory units 36 is N) and a memory unit 38, wherein every memory unit 36 can provide Nb-bit data via an Nb-line bus at the same time. By collecting data from all of N memory units 36, the N memory units can totally provide Nd-bit data at one time, where Nd is equal to N times Nb. A signal DQ, which is transmitted between the chipset 16 and the memory 18, transmits each set of Nd-bit data via the Nd-line bus separately.

In order to use an error checking code for implementing the data error checking/correction mechanism while accessing data from/to the memory 18, the memory 18 further utilizes the memory unit 38 for storing the error checking code. The memory unit 38 can transmit Ne-bit data via an Ne-Line bus at one time. A signal DQe, which is transmitted between the chipset 16 and the memory 18, transmits each set of Ne-bit data via the Ne-line bus separately for performing data error checking/correction.

In the data error checking/correction mechanism of the present invention, the chipset 16 comprises a data module 22A, a checking module 22B, two buffer modules 24A, 24B, a calculation module 26, a separation module 28, a matching module 30, and an interface circuit 32. The data module 22A accesses data from the memory 18, where the data is Nd-bit data provided by the N memory units 36. The checking module 22B accesses data from the memory 18 for data error checking/correction, where the data is Ne-bit data provided by the memory units 38. Data accessed by the data module 22A can be transmitted to the central processing unit 12 (and/or to the peripheral circuitry 14) via the interface circuit 32, and the central processing unit 12 (and/or the peripheral circuitry 14) can also store data into the memory units 36 of the memory 18 via the interface circuit 32 and the data module 22A. Moreover, for coordinating the operation timing of the chipset 16 and the memory 18, and also the data transmission sequence, the chipset 16 utilizes a clock signal to trigger the operation of the memory units 36, 38 in the memory 18. The chipset 16 further utilizes a data strobe signal DQS for synchronizing the transmission timing of every set of data. In the preferred embodiment of the present invention, the memory 18 is a higher data-rate memory, such as a double-data-rate memory. In other words, during data transmission, the data strobe signal DQS is synchronous to the clock signal, and when the data strobe signal DQS is rising and falling in a same period T, every memory unit 36 transmits two sets of Nb-bit data in order with the memory unit 38 transmitting two sets of Ne-bit data in order in the meantime.

When the data module 22A accesses data from every memory unit 36, the checking module 22B accesses data from the memory unit 38 for data error checking/correction in the meantime. Therefore the buffer module 24, the calculation module 26, the separation module 28, and the matching module 30 can implement the data error checking/correction mechanism according to the data accessed by the data module 22A and the checking module 22B. More particularly, the buffer module 24A can integrate two sets of Nd-bit data, which are accessed by the data module 22 in the same period T, into an integral set of 2Nd-bit data. The calculation module 26 uses a "2Nd-bit data/2Ne-bit error checking code" algorithm to generate a 2Ne-bit error checking code according to the integral 2Nd-bit data, wherein the 2Ne-bit error checking code will be temporarily stored in the separation module 28. In addition, the buffer module 24B can integrate two sets of Ne-bit data, which are accessed by the checking module 22B in the same period T, into an integral 2Ne-bit reference data. Therefore the matching module 30 can check whether the 2Ne-bit reference data matches the 2Ne-bit error checking code, and then perform data error checking/correction according to the matching result. In other words, although the data structure of the memory 18 is "Nd-bit data/Ne-bit error checking code", where the memory units 36 provide Nd-bit data space with the memory unit 38 providing Ne-bit data space, by using the characteristic of the double-data-rate memory, the present invention can use the "2Nd-bit data/2Ne-bit error checking code" algorithm to implement the data error checking/correction mechanism, in order to improve the efficiency of data error checking/correction.

Figure 2:
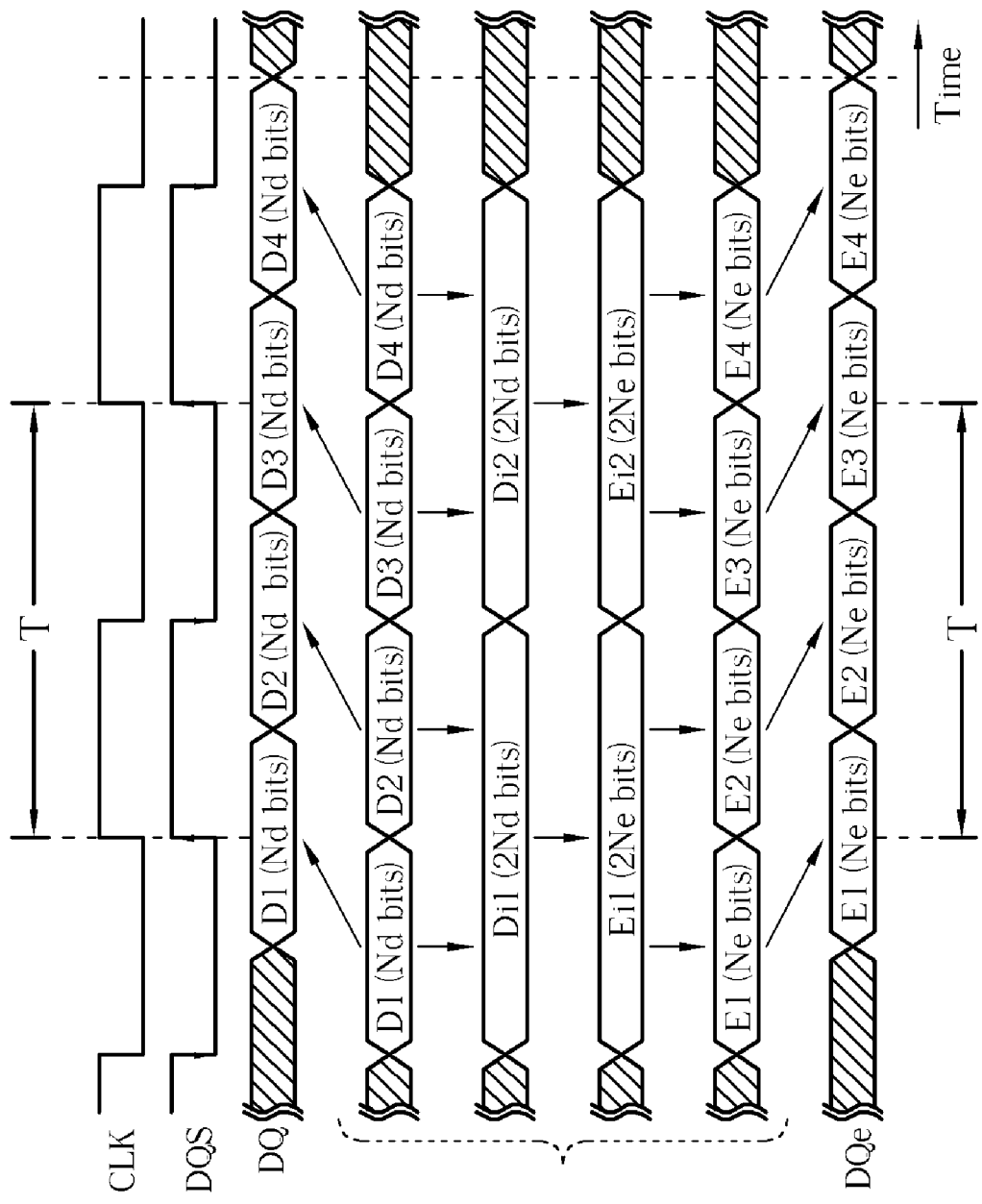
FIG. 2 is a time sequence diagram describing waveforms of related signals while the chipset of FIG. 1 stores data into the memory.

The procedure of the data error checking/correction performed by the chipset 16 of the present invention can be described as the following. Please refer to FIG. 2 (and refer to FIG. 1 as well). FIG. 2 shows a time sequence diagram that describes waveforms of related signals while the chipset 16 stores data into the memory 18. The horizontal axis of FIG. 2 represents time. When the chipset 16 is to store data into the memory 18, two sets of Nd-bit data, which will be stored into the memory units 36 of the memory 18 in a same period T, are first integrated into an integral 2Nd-bit data. As shown in FIG. 2, the two sets of Nd-bit data D1 and D2 are integrated into an integral 2Nd-bit data Di1, and the calculation module 26 uses the "2Nd-bit data/2Ne-bit error checking code" algorithm to generate 2Ne-bit data Ei1 as the error checking code according to data Di1. Thus the error checking data Ei1 can reflect the content of every bit in data Di1. Data Ei1, which is temporarily stored in the separation module 28, can be divided into two sets of Ne-bit data E1 and E2 as two sets of sub-checking data that correspond to data D1 and D2 respectively. When the data module 22A uses signal DQ to transmit data D1 and D2 to the memory units 36 of the memory 18 according to the data strobe signal DQS, the checking module 22B transmits the corresponding sub-checking data E1 and E2 to the memory unit 38 of the memory 18. Similarly, when the chipset 16 is to store two sets of Nd-bit data D3 and D4 into the memory 18, the two sets of Nd-bit data D3 and D4 are integrated into an integral 2Nd-bit data Di2 in order to generate a corresponding 2Ne-bit data Ei2 as the error checking code according to data Di2. Then, data Ei2 is divided into two sets of Ne-bit data E3 and E4 as two sets of sub-checking data corresponding to data D1 and D2 respectively. When the data strobe signal DQS is rising and falling in the same period T, data D3 and D4 are transmitted to the memory units 36 with the corresponding sub-checking data E3 and E4 being transmitted to the memory unit 38.

Figure 3:
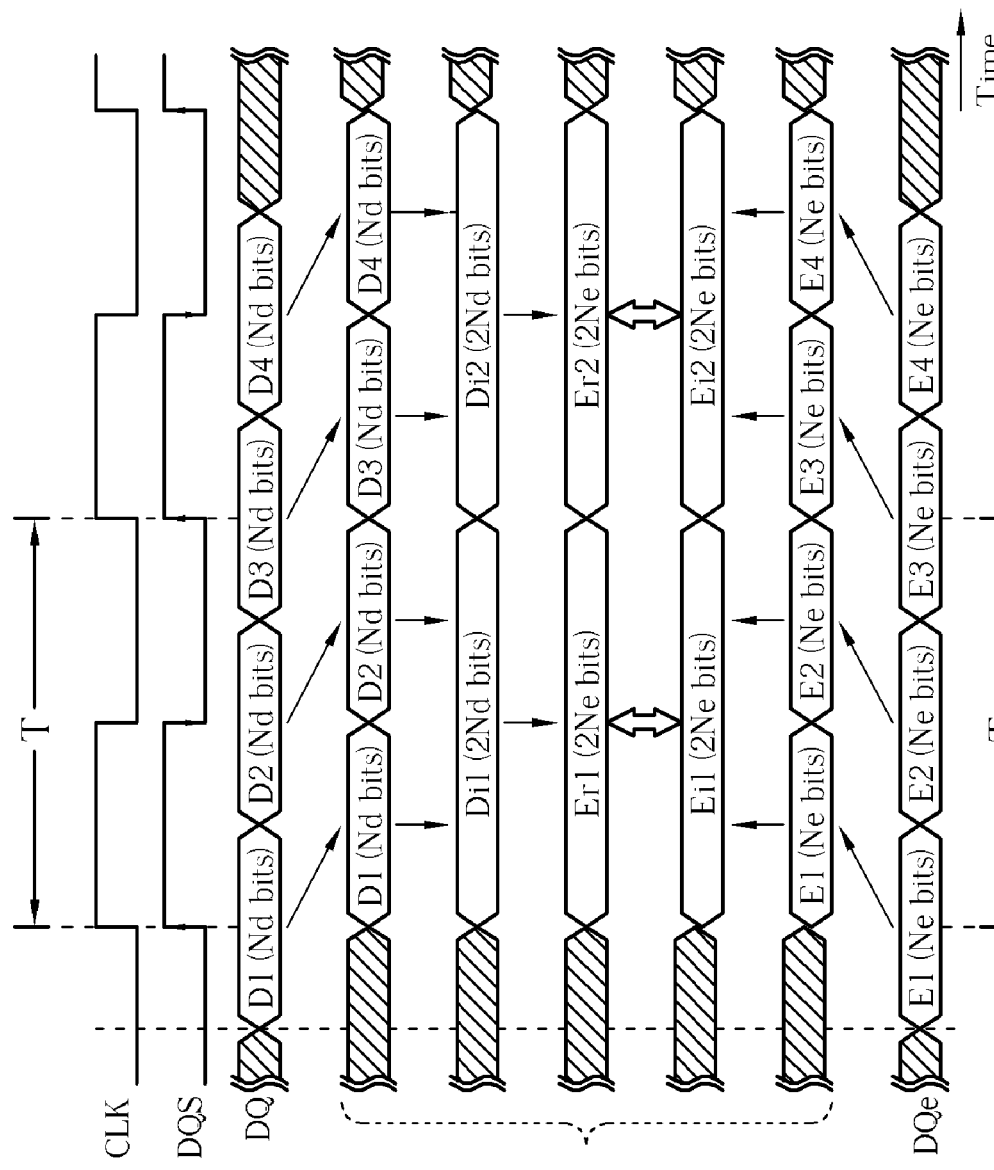
FIG. 3 is a time sequence diagram describing waveforms of related signals while the chipset of FIG. 1 accesses data from the memory.

Please refer to FIG. 3 (and refer to FIG. 1 and FIG. 2 as well). FIG. 3 shows a time sequence diagram of related signals while the chipset 16 accesses data from the memory 18. The horizontal axis of FIG. 3 represents time. Continuing the example of FIG. 2, when the chipset 16 is to access data D1 and D2 from the memory units 36, two sets of corresponding sub-checking data E1 and E2 will be accessed from the memory in the meantime. As shown in FIG. 3, when the data strobe signal DQS is rising and falling in a same period T, data D1 and D2 are transmitted by the signal DQ to the chipset 16 with two sets of corresponding sub-checking data E1 and E2 being transmitted by the signal DQe to the chipset 16 in the meantime. Thereafter, the buffer module 24A integrates the two sets of Nd-bit data D1 and D2 into an integral set of 2Nd-bit data Di1, and the buffer module 24B integrates the two sets of Ne-bit data E1 and E2 into integral 2Ne-bit data as error checking code Ei1.

According to the integral data Di1, the calculation module 26 can use the "2Nd-bit data/2Ne-bit error checking code" algorithm to generate 2Ne-bit data Er1 as the error reference code according to data Di1. Therefore the matching module 30 can check whether the two sets of data Ei1 and Er1 match each other in order to perform data error checking/correction. If these two sets of data do match each other, it means data D1 and D2 have not been damaged in the memory 18; if data Ei1 and Er1 do not match each other, then it means data D1 and D2 were damaged while being stored in the memory 18. Under this situation, the chipset 16 still can try to correct data D1 and D2 according to data Ei1 and Er1. For example, the chipset 16 can calculate how many bits of error data Di1 have, which is equivalent to how many bits of error data D1 and D2 have. If there are only a few bits of erroneous data, the chipset 16 can correct the integral data Di1 according to data Ei1 and Er1, which is equivalent to correcting data D1 and D2. Besides, the chipset 16 can also report the error situation to the central processing unit 12 in order to inform the user.

From the above, even when used in a low-cost computer system, whose memory data structure is 32-bit, the present invention still can use the "64-bit data/8-bit error checking code" algorithm to implement the data error checking/correction mechanism. Please refer to FIG. 1. In order to implement the data error checking/correction mechanism under a 32-bit memory data structure, the present invention utilizes four 8-bit memory units 36 to store data (that is N=4, Nb=8, Nd=32), and further utilizes a 4-bit memory unit 38 (that is Ne=4) to store corresponding sub-checking data. Therefore, according the characteristic of the double-data-rate memory, the present invention still can use the "64-bit data/8-bit error checking code" algorithm to implement the data error checking/correction mechanism. The "64-bit data/8-bit error checking code" algorithm has several advantages, first of all, there is no need to re-design a whole new algorithm and circuitry for the 32-bit data structure, the same circuitry can be applied to both the 64-bit and 32-bit data structures, therefore the design cost can be lower. In a better situation, the same chipset design can even support both the 64-bit and 32-bit data structures in order to meet different requirements of computer systems in a low-cost way. On the other hand, as mentioned above, a "32-bit data/6-bit error checking code" algorithm requires a 6-bit error checking code to perform data error checking/correction. Compared with the "64-bit data/8-bit error checking code" algorithm, each 32 bits of data only needs a 4-bit error checking code to implement the data error checking/correction mechanism, so therefore, the "64-bit data/8-bit error checking code" algorithm is more economic, and has higher efficiency for each bit.

Besides the above embodiment, when the present invention is applied to a computer system whose data structure is 32-bit, the memory unit 38 can also be an 8-bit memory unit for storing the error checking code. In this situation, the memory 18 has a total of five 8-bit memory units, wherein four 8-bit memory units 36 store 32 bits of data, and the other one 8-bit memory unit 38 stores 8 bits of data for data error checking/correction, that is Nb=Ne=8. In this example, the present invention can utilize the double-data-rate memory to collect two sets of 32-bit data with two sets of 8-bit sub-checking data in a same period T, and implement the data error checking/correction mechanism according to a "64-bit data/16-bit error checking code" algorithm. Although the "64-bit data/16-bit error checking code" algorithm is a new algorithm, the "64-bit data/16-bit error checking code" algorithm has better data error checking/correction capability compared with the "32-bit data/6-bit error checking code" algorithm. Because 64-bit data only needs an 8-bit error checking code to perform checking/correction for a one-bit error, a 16-bit error checking code can bring more error checking information in order to implement the higher-level data error checking/correction mechanism, such as correcting errors of multiple bits.

Generally, when developing an algorithm for data error checking/correction, the algorithm will be designed at least to be capable of checking or correcting a one-bit error, that is, when multi-bit data has a one-bit error, the corresponding error checking code can reflect which bit is the erroneous bit, such that the error bit can be corrected. Under the 32-bit data structure, a one-bit error may occur in any one bit of the 32 bits of data (or there may be no erroneous bit). To cover the range of 1 to 32 (or 0 to 31), the error checking code must have at least five bits, and there must be one more bit to represent the non-error condition, thus the error checking code must have at least six bits. From the above, to correct a one-bit error, the number of bits has a logarithmic relationship between the data and its corresponding error checking code. When the number of bits of the data is doubled, only one more bit is needed by the corresponding error checking code. Therefore, the more bits the data has, the higher the efficiency the bits of the error checking code. As mentioned above, 32-bit data needs a 6-bit error checking code, and 64-bit data needs an 8-bit error checking code (actually it only needs a 7-bit error checking code, but 8-bits are typically used). That is, under the 64-bit data structure, every bit of the error checking code has higher efficiency while performing data error checking/correction. The present invention fully utilizes the characteristic of the higher data-rate memory to collect a plurality of sets of data within a same period of time, and perform the data error checking/correction to an integral higher-bit data in order to provide a more economic and higher efficiency way.

Figure 4:
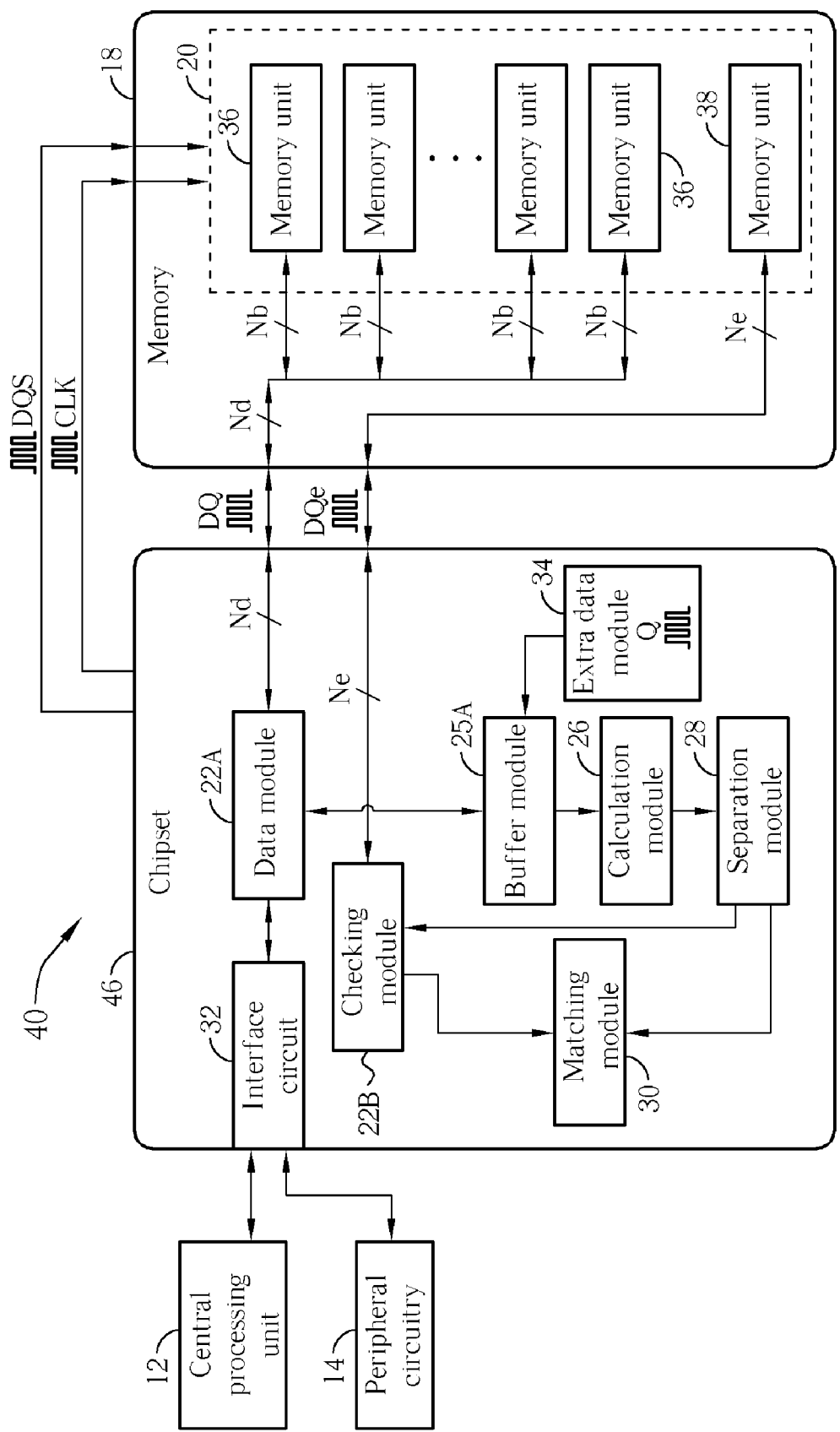
FIG. 4 is a functional block diagram of another computer system according to the present invention.
Figure 5:
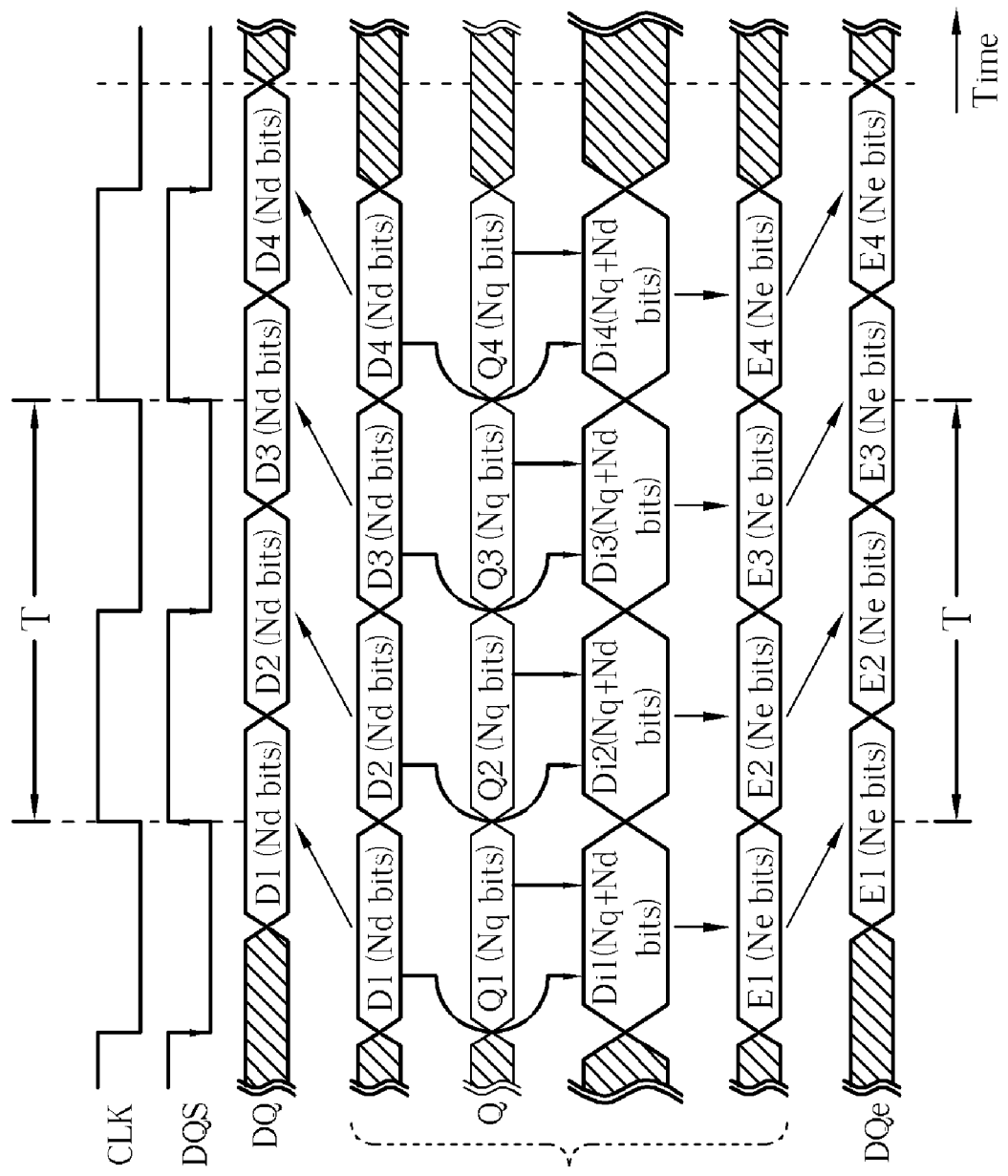
FIG. 5 is a time sequence diagram describing waveforms of related signals while the chipset of FIG. 4 stores data into the memory.

Please refer to FIG. 4, which shows a functional block diagram of another computer system 40 according to the present invention. For simplicity, each device that has the same reference numeral in FIG. 4 and FIG. 1 has the same function, such as the central processing unit 12, the peripheral circuitry 14, the memory 18, the interface circuit 32, the data module 22A, the checking module 22B, the calculation module 26, the separation module 28, the matching module 30, and the memory units 36 and 38. A difference is, the chipset 46 of the computer system 40 further comprises an extra data module 34, when implementing the data error checking/correction mechanism, the buffer module 25A integrates data accessed by the data module 22A with extra data provided by the extra data module 34 into an integral data. Please further refer to FIG. 5 and FIG. 6 (and refer to FIG. 4 as well). FIG. 5 shows a time sequence diagram describing waveforms of related signals while the chipset 46 stores data into the memory 18, and FIG. 6 shows a time sequence diagram describing waveforms of related signals while the chipset 46 accesses data from the memory 18.

As shown in FIG. 5, when the chipset 46 is to store data D1 into the memory 18, the Nd-bit data D1 and a Nq-bit extra data Q1 in the signal Q are integrated into an integral data Di1, such that data Di1 has (Nd+Nq) bits. Therefore, the calculation module 26 can use the "(Nd+Nq)-bit data/Ne-bit error checking code" algorithm to generate an Ne-bit error checking code according to data Di1. Data D1 in the signal DQ is then transmitted to the memory units 36 according to the data strobe signal DQS. In the meantime, the corresponding sub-checking data E1 in the signal DQe is also transmitted to the memory unit 38. Similarly, data D2 and D3 are integrated with the extra data Q2 and Q3 respectively into higher-bit data in order to generate the corresponding error checking codes E2 and E3. Thereafter, data D2 and D3 are stored into the memory units 36 with data E2 and E3 being stored into the memory units 38.

Figure 6:
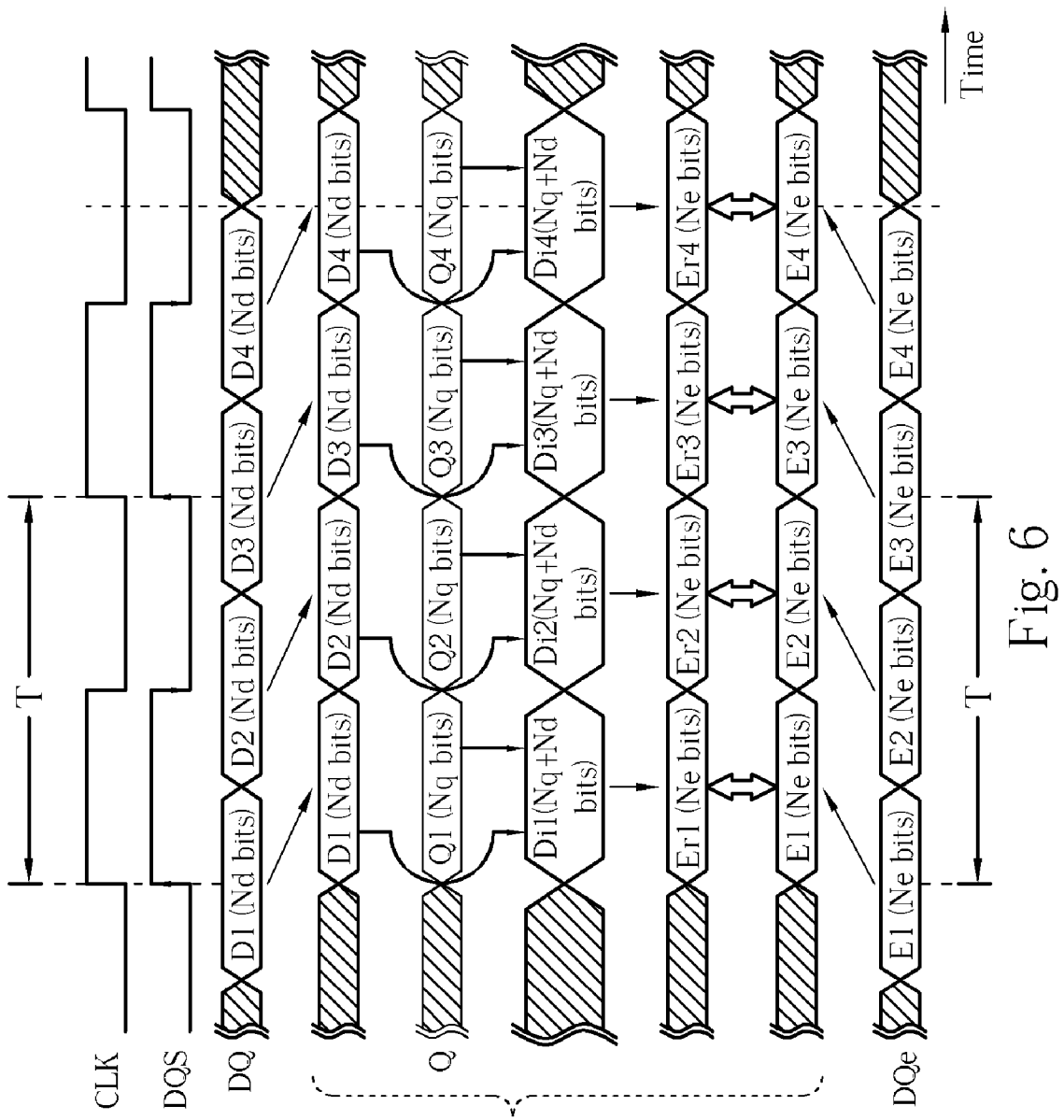
FIG. 6 is a time sequence diagram describing waveforms of related signals while the chipset of FIG. 4 accesses data from the memory.

As shown in FIG. 6, when the chipset 46 accesses data D1 from the memory 18, the chipset 46 can access the corresponding error checking code E1 in the meantime. Thereafter, the accessed data D1 and the extra data Q1 are integrated into an integral data Di1. Then, the chipset 46 uses the "(Nd+Nq)-bit data/Ne-bit error checking code" algorithm to generate a corresponding error checking code Er1, and compares data Er1 with data E1 for data error checking/correction. Under the 32-bit data structure, the embodiment of FIG. 4 can utilize five 8-bit memory units, such that, after integrating an extra set of 32-bit data Q with a set of 32-bit data, a corresponding 8-bit error checking code (that is, Ne=8) can be generated by the "64-bit data/8-bit error checking code" algorithm. Each extra set of 32-bit data Q can be identical, for example, each can be 32 bits of digital "0". Because contents of the extra data Q are fixed and known, the related data error checking/correction algorithm may have better data error checking/correction capability.

The prior art can only perform data error checking/correction to a single set of data. Thus the prior art lacks flexibility during operation, and every bit of the error checking code cannot achieve a better efficiency. In contrast to the prior art, the present invention integrates a plurality of sets of data into an integral higher-bit data for implementing the data error checking/correction mechanism. The present invention not only has a better efficiency, but also can widely support computer systems with different data structures in order to reduce design time and cost. In the preferred embodiment of the present invention, according to the higher data-rate memory technique, a plurality of sets of data can be accessed within a same period. Then, the plurality of sets of data are integrated into an integral higher-bit data in order to perform data error checking/correction. For example, for a double-data-rate memory, the present invention can access two sets of data within the same clock period, and integrate these two sets of data into an integral data. If using a quadruple-data-rate memory, the present invention can access four sets of data within the same period, and integrate these four sets of data into an integral data for performing data error checking/correction. As known by those skilled in the art, although the present invention only describes one memory module and one channel (data bus), the present invention can widely support computer systems that have multiple memory modules and multiple channels. In addition, each module in the chipset can be implemented by way of software, firmware, hardware, or any combination of these. For example, the calculation module can be implemented with a hardware logic circuit. The present invention not only can be applied to chipsets, but also every kind of memory control circuitry, such as the memory control circuitry of a system-on-chip (SoC).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for data error checking, the method comprising:
    integrating a plurality of sets of data into a first integral data;
    performing an error checking code algorithm according to the first integral data in order to generate an error checking data correspondingly;
    dividing the error checking data into a plurality of sets of sub-checking data, wherein one set of sub-checking data corresponds to one of the plurality of sets of data; and
    when transmitting each of the plurality of sets of data to a plurality of first memory units of a memory in order, transmitting the corresponding sub-checking data to a second memory unit of the memory in the meantime.

2. The method of claim 1 wherein the error checking code algorithm is a 64-bit data/8-bit error checking code algorithm.

3. The method of claim 1 wherein the sets of data are accessed at different times separately.

4. The method of claim 1 further comprising:
    storing the sets of data in a memory at different times separately; and
    when storing each of the sets of data in the memory, storing the corresponding sub-checking data in the memory in the meantime.

5. The method of claim 3 further comprising:
    accessing each of the plurality of sets of data with the corresponding sub-checking data by the memory;
    integrating the plurality of sets of data into a second integral data in order to perform the error checking code algorithm for generating a reference data correspondingly; and
    dividing the reference data into a plurality of sets of sub-reference data, and checking whether the plurality of sets of sub-checking data matches the plurality of sets of sub-reference data.

6. The method of claim 3 further comprising:
    accessing each of the plurality of sets of data with the corresponding sub-checking data by the memory;
    integrating the plurality of sets of data into a second integral data in order to perform the error checking code algorithm for generating a reference data correspondingly; and
    integrating the plurality of sub-checking data into an integral checking data, then checking whether the integral checking data matches the reference data.

7. The method of claim 1 wherein the plurality of sets of data is accessed while a data strobe signal is rising and falling.

8. The method of claim 7 wherein the error checking data is generated by a logic computation according to a clock signal, and a period of the clock signal is equal to a period of the data strobe signal.

9. A chipset comprising:
    a data module for accessing a plurality of sets of data;
    a buffer module for integrating the plurality of sets of data into a first integral data;
    a calculation module for performing a error checking code algorithm according to the first integral data in order to generate an error checking data correspondingly, wherein the error checking data is changed following any change of the plurality of sets of data;
    a separation module for dividing the error checking data into a plurality of sets of sub-checking data, wherein one set of sub-checking data corresponds to one of the plurality of sets of data; and
    a checking module, wherein when the data module transmits each of the plurality of sets of data in order, the checking module transmits the corresponding sub-checking data in the meantime.

10. The chipset of claim 9 wherein the data module accesses the sets of data at different times separately.

11. The chipset of claim 9 wherein the data module stores the sets of data in a plurality of first memory units of a memory at different times separately; and when the data module stores each of the sets of data in the plurality of first memory units of the memory, the checking module stores the corresponding sub-checking data in a second memory unit of the memory in the meantime.

12. The chipset of claim 11 wherein each of the plurality of first memory units comprises more bits than the second memory unit.

13. The chipset of claim 11 wherein each of the plurality of first memory units and the second memory unit comprise the same amount of bits.

14. The chipset of claim 11 further comprising a matching module, when the memory accesses the plurality of sets of data with the corresponding sub-checking data, integrating the plurality of sets of data into a second integral data for performing the error checking algorithm in order to generate a reference data correspondingly, and dividing the reference data into a plurality sets of sub-reference data, and using the matching module to check whether the plurality of sets of sub-checking data matches the plurality of sets of sub-reference data.

15. The chipset of claim 11 further comprising a matching module, when the memory accesses the plurality of sets of data with the corresponding sub-checking data, integrating the plurality of sets of data into a second integral data for performing the error checking algorithm in order to generate a reference data correspondingly, and integrating the plurality of sub-checking data into an integral checking data, then using the matching module to check whether the integral checking data matches the reference data.

16. The chipset of claim 9 wherein the data module accesses the plurality of sets of data while a data strobe signal is rising and falling.

17. The chipset of claim 16 wherein the calculation module performs a logic computation according to a clock signal in order to generate the error checking data, and a period of the clock signal is equal to a period of the data strobe signal.

18. The chipset of claim 9 wherein the error checking code algorithm in the calculation module is a 64-bit data/ 8-bit error checking code algorithm.

19. The chipset of claim 9 further comprising an extra data module for providing a plurality of sets of extra data to the buffer module in order to integrate the plurality of sets of extra data with the plurality of sets of data into a third integral data.

* * * * *